Nov. 4, 1924.
P. E. HOLT
1,514,158
DOUBLE SPRING YOKE ADJUSTMENT
Filed Sept. 3, 1919
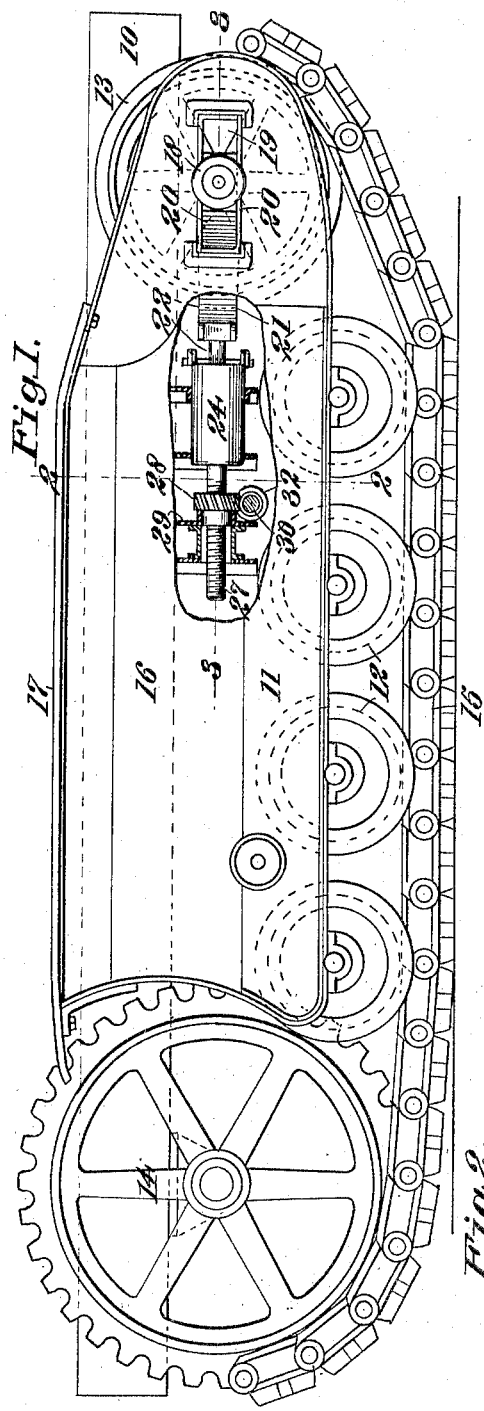
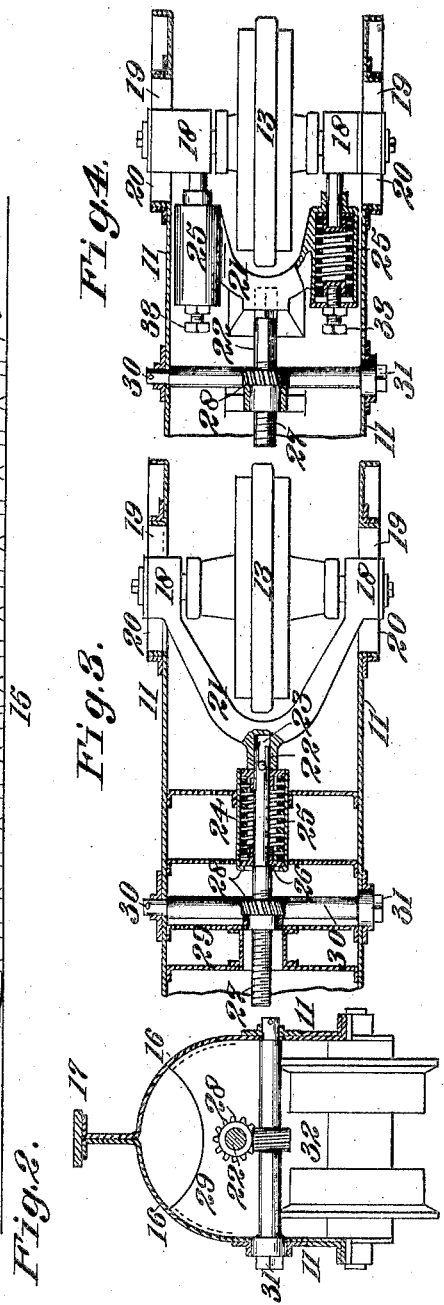
INVENTOR
Pliny E. Holt
BY Strong & Townsend
ATTORNEYS Patented Nov. 4, 1924.

1,514,158

UNITED STATES PATENT OFFICE.

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

DOUBLE-SPRING YOKE ADJUSTMENT.

Application filed September 3, 1919. Serial No. 321,436.

*To all whom it may concern:*

Be it known that I, PLINY E. HOLT, a citizen of the United States, residing at Stockton, in the county of San Joaquin and State of California, have invented new and useful Improvements in Double-Spring Yoke Adjustments, of which the following is a specification.

This invention relates to tractors of the chain track type, and more particularly to a mounting for one of the sprocket wheels of the chain track.

In tractors of this type the front idler wheel, while being capable of adjustment upon the truck frame in a fore and aft direction to take up slack occurring in the track, this adjustment is always made by hand and is one requiring a great deal of effort and time since the sprocket wheel must be pushed forwardly against the tremendous weight of the track. Also this rigid connection for the sprocket wheel results sometimes in the breakage of the track where an unyielding obstruction falls upon the track and is carried by the latter into contact with the sprocket wheel.

In the present invention I have provided a mounting for one of the sprocket wheels, such that the bearings thereof are freely slidable on the truck frame and are held in a forward position by spring-pressed means, the pressure of the spring on the sprocket wheel being sufficient to maintain the chain track under the required tension at all times and yet being sufficiently yielding to permit the sprocket wheel to move inwardly in case an unyielding obstruction is carried between the sprocket wheel and track. Thereby I overcome the work of manually adjusting the position of the sprocket wheel to take up slack occurring in the track and also insure against breakage of the track.

Referring to the accompanying drawings:

Fig. 1 shows a side elevation of a tractor embodying my invention.

Fig. 2 shows a sectional view, taken on the line 2—2 of Fig. 1.

Fig. 3 shows a sectional view, taken on the line 3—3 of Fig. 1.

Fig. 4 shows a modified form of the arrangement illustrated in Fig. 3.

The tractor herein shown comprises a main frame 10, at each side of which is a truck mechanism made up of a truck frame 11, on which are journaled supporting rollers 12 and at the forward end of which is carried an idler sprocket wheel 13. A toothed sprocket wheel 14 is journaled upon the main frame and an endless chain track 15 is carried by the toothed sprocket and the idler wheel, passing beneath the rollers 12.

The truck frame 11 herein shown is of special construction employing steel side plates 16, spaced apart at their lower portions and brought into contact with each other at their upper edges, whereby to enclose the upper portion of the truck mechanism. A guide rail 17 is formed at the upper edges of the contacting side plates and serves as a support for the upper run of the chain track. The idler sprocket wheel 13 is carried in bearings 18, said bearings being slidable in slots 19 formed by cutting the side plates and pressing the cut portions outwardly to form flanges 20.

In the usual type of tractor of this nature the idler sprocket wheel 13 is carried on bearings which are slidable on the truck frame, such bearings being adapted to be secured in a variety of positions thereon so that the location of the idler sprocket wheel may be changed for the purpose of taking up slack in the chain track or otherwise adjusting the tension of the track.

The operation of shifting this idler sprocket wheel against the tremendous weight of the chain track is one requiring considerable effort and time. In the present invention the bearings for the idler sprocket wheel are freely movable in the slots 19 and a yoke 21 extends rearwardly from said bearings and has a stem 22 which fits in a socket 23 and is slidable therein. This stem passes through a cylinder 24, fixed upon the truck frame and within which cylinder is an extensible coil spring 25. The cylinder 24 has a movable head 26 at its rear end which serves as a pressure plate for the spring 25, said movable head 26 being carried upon the stem 22 and abutting against the shoulder of the latter. The rear end of the stem 22 is screw-threaded, as shown at 27, and carries a worm gear 28, which worm gear has a hub portion screw-threaded interiorly to cooperate with the screw-threaded portion of the stem. The said worm gear 28 is held against rearward movement of the screw-threaded stem by means of a plate 29 fixed to the truck frame.

Passing transversely of the truck frame and journaled in opposite side plates is a shaft 30, one end of which is fitted with an angular head or socket 31 to receive a wrench or crank. This shaft 30 has fixed upon it a spiral gear 32 to cooperate with the worm gear 28.

In operation, the idler sprocket wheel is kept in forward position under the pressure of the spring 25 and is held yieldingly in such position. Any slack occurring in the chain track is automatically taken up by the action of the said spring. Since the bearings for the idler sprocket wheel are freely slidable on the truck frame it will be seen that should any obstruction fall upon the track and become lodged between the track and either sprocket wheel, then this idler sprocket wheel will be forced rearwardly, compressing the spring 25 and allowing the obstruction to pass through without danger of breaking the track. When for any reason the tension of the track becomes less than desired the spring 25 can be further compressed by turning the shaft 30 from the exterior of the truck frame.

In Fig. 4 I have shown a modified form in which two springs 25 are employed, one on each leg of the yoke 21. The action of the modified form is the same as that already described. The advantage of the modified arrangement is to permit the use of lighter springs, since two are used in place of one. In this modified arrangement I show an adjusting bolt 33 seated in the head of each of the cylinders 24 for the purpose of independently adjusting the tension of the springs 25.

Various changes in the construction and arrangement of the several parts herein shown and described may be employed without departing from the spirit of my invention as disclosed in the appended claims.

Having thus described my invention, what I claim and desire to secure by Letters Patent is—

1. In a tractor truck mechanism, the combination with the truck frame having spaced side members, a rear sprocket wheel, a front idler sprocket movably mounted in the frame and a flexible track tread pressing around the sprocket wheel and idler sprocket, of a yielding thrust support for advancing the idler sprocket and holding the track tread under tension, comprising a shaft in rear of the idler sprocket with means for adjusting the shaft longitudinally toward and from the idler sprocket, a thrust yoke having its arms extended on opposite sides of the idler sprocket and supporting the bearings of the idler sprocket against rearward movement and at its rear end supported by the adjustable shaft and compression spring supporting means interposed between the idler sprocket bearings and the shaft.

2. In a tractor truck mechanism, the combination with the truck frame having spaced side members, a rear sprocket wheel, a front idler sprocket, bearings for the idler sprocket movably mounted in the frame, and a flexible track tread passing around the sprocket wheel and idler sprocket, of a thrust support for advancing the idler sprocket and holding the track tread under tension, comprising a thrust yoke having forwardly extending arms connected with the bearings for the idler sprocket, means for holding the rear end of the yoke against transverse movement, a longitudinally adjustable shaft journaled in the frame between the rear and front sprockets, and engaging the rear end of the yoke for advancing the yoke and idler sprocket, means for moving said shaft into fixed positions of longitudinal adjustment and yielding spring means interposed between the shaft and the bearings.

3. In a chain track truck mechanism, a truck frame, a sprocket wheel journaled thereon and having its bearings slidably connected thereto, a thrust member connected to the bearings, a spring included in said thrust member acting to yieldingly force the same forwardly, a worm wheel on the thrust member and a screw shaft fixed to the frame and with which the worm wheel meshes.

4. In a chain track truck mechanism, a truck frame, a sprocket wheel journaled thereon and having its bearings slidably connected thereto, a thrust member connected to the bearings and adjusting connections between the thrust member and the frame comprising a worm wheel and a screw shaft.

In testimony whereof I have hereunto set my hand in the presence of two subscribing witnesses.

PLINY E. HOLT.

Witnesses:
CHARLES L. NEUMILLER,
DAVID B. LYMAN.